United States Patent [19]

Gowda et al.

[11] Patent Number: 4,673,997
[45] Date of Patent: Jun. 16, 1987

[54] ELECTRICALLY CONDUCTIVE FERROFLUID BEARING AND SEAL APPARATUS AND LOW-VISCOSITY ELECTRICALLY CONDUCTIVE FERROFLUID USED THEREIN

[75] Inventors: Hanumaiah L. Gowda, Nashua; Kuldip Raj, Merrimack; Lucian Borduz, Nashua, all of N.H.

[73] Assignee: Ferrofluidics Corporation, Nashua, N.H.

[21] Appl. No.: 773,627

[22] Filed: Sep. 9, 1985

Related U.S. Application Data

[63] Continuation-in-part of Ser. No. 713,757, Mar. 19, 1985, Pat. No. 4,604,229, and Ser. No. 736,338, May 21, 1985, Pat. No. 4,604,222.

[51] Int. Cl.$^4$ .......................... G11B 5/52; G11B 21/04; E21B 33/00; G01M 27/82
[52] U.S. Cl. ................................ 360/107; 252/62.52; 277/80
[58] Field of Search ................... 277/80, 135; 252/62.51 R, 62.52; 360/107

[56] References Cited

U.S. PATENT DOCUMENTS

| | | | |
|---|---|---|---|
| 3,990,981 | 11/1976 | Kovac et al. | 252/62.5 |
| 4,094,804 | 7/1978 | Shimoiizaka | 252/62.52 |
| 4,315,827 | 2/1982 | Bottenberg et al. | 252/62.52 |
| 4,363,047 | 12/1982 | Maruyama et al. | 360/107 |
| 4,490,759 | 12/1984 | Maruyama | 360/107 |
| 4,526,484 | 7/1985 | Stahl et al. | 277/80 |

Primary Examiner—Robert S. Tupper
Assistant Examiner—Melissa J. Koval
Attorney, Agent, or Firm—Richard P. Crowley

[57] ABSTRACT

An electrically conductive ferrofluid-film-bearing apparatus and seal apparatus for a shaft which employs a low-viscosity, electrically conductive ferrofluid composition, which composition comprises a liquid carrier, and contains in combination an electrically conductive amount of a cationic surfactant and dispersed carbon particles, to obtain a low-electrical-resistivity ferrofluid having a low viscosity and suitable for use in a ferrofluid bearing apparatus.

17 Claims, 2 Drawing Figures

ELECTRICALLY CONDUCTIVE FERROFLUID BEARING AND SEAL APPARATUS AND LOW-VISCOSITY ELECTRICALLY CONDUCTIVE FERROFLUID USED THEREIN

REFERENCE TO PRIOR APPLICATION

This application is a continuation-in-part of U.S. patent application Ser. No. 713,757, filed Mar. 19, 1985, now U.S. Pat. No. 4,604,229, issued Aug. 5, 1986, by the same inventors, which is incorporated by reference in its entirety. The parent application is directed to an electrically conductive ferrofluid composition, which composition comprises a liquid carrier, magnetic particles to impart magnetic properties, electrically conductive carbon particles in an amount to provide electrically conductive properties to the ferrofluid composition, and a dispersing agent in an amount sufficient to disperse and to stabilize the magnetic electrically conductive paricles in the liquid carrier. Typically, the carbon particles are present in an amount of from about 1% to 25% by weight of the composition, while the dispersing agent comprises an anionic surfactant, and with the carbon particles having an average particle size of about 20 to 300 Angstroms, and an aggregate particle size of up to 1 mm. The electrically conductive ferrofluid composition is disclosed as being usefully employed in a ferrofluid seal about a rotating-shaft member which may be subject to the accumulation of static charges, such as the rotating-shaft member of a computer-disc-drive apparatus. The electrically conductive ferrofluid composition is characterized by an electrical resistivity of about $10^3$ ohms per centimeter or less. Typically, the electrically conductive ferrofluid composition is employed in first, second or multiple radial gaps formed by an annular permanent magnet and one or more pole pieces, in combination with a conductive means, to conduct the electrical charges from the electrically conductive ferrofluid in the seal gap to the ground.

This application is also a continuation in part of U.S. Ser. No. 736,388, filed May 21, 1985 by Lucian Borduz and Kuldip Raj, now U.S. Pat. No. 4,604,222, issued Aug. 5, 1986. The present application, as well as the two pending parent applications, have been assigned to a common assignee, Ferrofluidics Corporation of Nasuha, N.H. U.S. patent application Ser. No. 736,388, filed May 21, 1985, now U.S. Pat. No. 4,604,222 is hereby incorporated by reference in this application. This application is directed to a stable ferrofluid composition and to the use of the ferrofluid composition in a seal apparatus. The ferrofluid composition comprises a liquid carrier, ferromagnetic particles to provide magnetic properties, and a dispersing amount of a cationic surfactant, to disperse the ferromagnetic particles and also to provide improved electrical conductivity to the ferrofluid composition. Typically, the cationic surfactant employed is composed of a cationic, positively charged portion; for example, a nitrogen atom, and a long-chain portion; for example, a hydrocarbon, with the long-chain portion compatible with or soluble in the organic liquid carrier used in the ferrofluid composition. Generally, the cationic surfactant is present in a ratio by weight of surfactant to magnetic particles of from about 1:1 to 20:1, while the organic liquid carrier may comprise a variety of materials, such as hydrocarbons, polyalpha olefins or other liquid nonvolatile carriers. The organic liquid carrier also may comprise an ester glycol, particularly where the cationic surfactant comprised a polyalkyloxylate portion, such as a polyethoxylate or polypropoxylate portion. Typically, the cationic surfactant is selected from a quaternary-ammonium surfactant which comprised a fatty-acid quaternary imidazole salt, a polyprooxy quaternary-ammonium salt or a cessalated polypropylene salt or combinations thereof. The stable ferrofluid compositions are usefully employed in computer-disc-drive applications, to provide the conventional sealing function and further for the conduction of electrical charges, so as to prevent charge buildup.

BACKGROUND OF THE INVENTION

Ferrofluid is typically employed in hydrodynamic bearings as a bearing fluid and often in combination of ferrofluid bearing-seal arrangements. One ferrofluid-film-bearing embodiment used commercially in computer-disc-drive applications is where the ferrofluid is employed both as a fluid bearing and as a seal, in connection with a ferrofluid seal apparatus at each end of the bearing. The main components of a ferrofluid-film-bearing device employed in the computer-disc drives comprises a radial bearing, a pair of thrust bearings and usually two ferrofluid seal apparatuses at one or each end of the bearing cavity, to retain the ferrofluid within the bearing cavity (see, for example, U.S. Pat. No. 4,526,484, issued July 2, 1985).

In computer-disc-drive applications, the speed of the bearing is or approaches 3600 rpms, which may be accomplished with the use of an in-line motor. The radial clearance in the bearing varies, but generally may be up to 0.6 mil, and the bearing may be a three- or four-sector bearing assembly.

The advantages of such a bearing assembly, over conventional ball-bearing-spindle assemblies, are extremely low nonrepetitive runout, damping and quietness of operation. The ferrofluid-film-bearing spindle in the bearing assembly, however, needs to be grounded in computer-disc-drive and other applications, since the rotating disc-drive shaft accumulates electrical charges, and, consequently, a potential difference is produced between the head of the computer disc drive and the disc. This accumulated charge on the rotating disc shaft must be grounded, in order to avoid a spark which may damage the disc or the magnetic head, with the consequent loss of information on the disc. Generally, a grounding scheme is used, wherein a grounding button is employed in contact with the shaft, to conduct built-up static charges to ground. The grounding button, however, is not fully satisfactory, since it tends to generate particles in use, produces noise, wears with time, adds a new component into the bearing and seal device, and makes the resulting bearing seal assembly more expensive and unreliable with time.

Further, in the operation of a ferrofluid bearing, the ferrofluid composition employed needs to be a low-viscosity ferrofluid composition, such as a composition having a viscosity of less than 50 cps to 27° C. or more typically 25 cp or 15 cp or less. Low-viscosity ferrofluid compositions suitable for use would be an ester-based ferrofluid having a 200-gauss magnetization and viscosity of 15 cps at 27° C. A low-viscosity ferrofluid provides for a low power consumption for the bearing assembly, and a small temperature rise, minimizing the thermal expansion of the components in the bearing assembly, thereby maximizing bearing performance by such thermal expansion. A small temperature rise is further necessary in reducing the viscosity changes and, thus, not affecting the load-bearing characteristics and capabilities of the bearing assembly.

Therefore, it is desirable to provide for an electrically conductive bearing apparatus and for a low-viscosity electrically conductive ferrofluid composition for use in such bearing apparatus.

SUMMARY OF THE INVENTION

The present invention concerns an electrically conductive ferrofluid bearing apparatus and low-viscosity, electrically conductive ferrofluid compositions for use in such bearing apparatus. In particular, the invention relates to a ferrofluid bearing and seal apparatus, particularly useful for computer-disc drives in which the grounding button of the prior art has been eliminated, and in which a low-viscosity, electrically conductive, special ferrofluid composition is employed.

The present invention provides for a unique ferrofluid-film-bearing assembly which does not require a grounding button, and also for a unique composite ferrofluid-film-bearing and seal assembly, both particularly useful for the application of computer-disc drives, and in which both apparatuses there are no grounding buttons required, eliminating the disadvantages associated with such prior-art grounding buttons. The ferrofluid bearing apparatus employs a unique low-viscosity, electrically conductive ferrofluid, typically having an electrical resistivity of about $10^{+2}$ ohm centimeters or less and a viscosity of about 50 cps at 27° C.; for example, 25 cps or less.

The electrically conductive ferrofluid composition comprises a liquid carrier which contains magnetic particles, such as ferromagnetic particles, in a sufficient amount to provide for magnetic properties to the ferrofluid, the magnetic particles being dispersed in the liquid carrier, and also includes in combination an electrically conductive amount of a cationic surfactant, which acts both as the dispersing agent for the ferromagnetic particles and to provide electrically conductive properties to the ferrofluid composition. The ferrofluid composition may also include a controlled amount of dispersed carbon particles, such as finely-divided carbon-black particles, which, in combination with the cationic surfactant, provides for a low electrical resistivity.

The low-viscosity ferrofluid compositions employ only a small amount of finely-divided carbon particles; that is, generally up to about 4% by weight of the ferrofluid composition, and typically from about 0.1% to 4%; for example, 0.5% to 2.5%, and which carbon particles are added in a controlled amount, in order to avoid a significant increase in the viscosity of the ferrofluid composition. The employment of small amounts of carbon particles into the ferrofluid composition, while it provides for a slight increase in viscosity, such as to about 25 to 50 cps, is still acceptable for ferrofluid compositions used in bearings, but the electrical conductivity is considerably and unexpectedly improved, in combination with the cationic surfactant, thereby eliminating the need for a separate grounding button in ferrofluid bearing apparatuses, when the low-viscosity, electrically conductive ferrofluid composition is employed. While the employment of carbon particles, dispersed in a ferrofluid composition is described in the parent application Ser. No. 713,757, typically the amount of carbon particles employed for a seal may be considerably greater, leading to a thixotropic or thickened ferrofluid composition, which would be unacceptable for use in bearing assemblies. The fluid can be used as it is without carbon particles.

In addition, while cationic surfactants are employed, to provide a stable and electrically conductive ferrofluid composition in parent application Ser. No. 736,388, both compositions are designed primarily for ferrofluid seal uses and good stability is desired. Thus, ferrofluids based on cationic surfactants are known from the prior application, and the use of such surfactants provides for erosion resistance and provides an increase in electrical properties to the ferrofluid composition. It has been found that the electrical properties of the ferrofluid can be enhanced further by the combination of a colloidal suspension of fine carbon particles, together with a cationic surfactant, without resulting in a high-viscosity or thixotropic ferrofluid composition, which would be unacceptable for use in ferrofluid bearing apparatuses.

The low-viscosity, electrically conductive ferrofluid composition may be employed in prior-art bearing apparatuses, without the use of the spring-loaded grounding button, to conduct the accumulated static charge from the rotating, magnetically conductive shaft, since the substitution of the electrically conductive ferrofluid composition for the prior nonconductive ferrofluid or the prior nonconductive hydrodynamic bearing liquids prevents the accumulation of static charge through conducting the static charge through the electrically conductive ferrofluid composition and the shaft to the ground.

Alternatively, one or two separate ferrofluid seal apparatuses may be employed in a composite ferrofluid bearing and seal apparatus, employing conventional thixotropic conductive ferrofluid compositions, as in parent application Ser. No. 713,757 for grounding purposes. The employment of one or two ferrofluid seals, such as to retain the low-viscosity ferrofluid or hydrodynamic liquid in the bearing cavity, introduces very small power consumption, even though a thixotropic or a high-viscosity ferrofluid composition is employed, and such compositions further aid in the retention of the ferrofluid in the bearing, by having a higher viscosity in the O-ring seal about the shaft.

Typically, the electrically conductive, low-viscosity ferrofluid composition used as a bearing fluid may be based on the same or a similar liquid carrier, as in the carrier employed in the ferrofluid seal, to ensure compatibility, although, if desired, but not recommended, noncompatible liquid carriers may be employed. It has been found that the low-viscosity, electrically conductive ferrofluid compositions useful in the bearing apparatus provide for resistivities as low as 50 ohms, such as, for example, as low as 10 or less ohms, since the large surface area of the bearing in the very small surface area of the radial gap in the seal apparatus contributes to low resistance. Where the low-viscosity ferrofluid compositions are employed in bearing assemblies, for use in computer-disc-drive applications, resistance values in the range of kilo ohms or $10^5$ ohms-cm or less are acceptable for grounding the accumulated static charge.

The low-viscosity ferrofluid compositions may comprise nonpolar organic liquid carriers, such as a hydrocarbon, or a polar organic liquid carrier, such as an ester, or even carriers such as water, glycol, esters and the like, and ferromagnetic particles in an amount sufficient to impart magnetic characteristics and properties to the ferrofluid composition, such as in an amount ranging from 5% to 20% by weight of the liquid carrier. The ferrofluid composition also includes a dispersing amount and an additional electrically conductive amount of a cationic surface-active agent, typically a quaternary-ammonium surface-active agent, as a dispersing agent. The magnetic particles employed are those magnetic-type particles commonly employed in preparing ferrofluid compositions, and may comprise finely-divided particles of ferromagnetic materials, such as, for example, magnetic particles having generally less than a 1000 Angstroms, and typically 20 to 200 Angstroms. The ratio of the cationic surfactant, as a dispersing agent, to the ferromagnetic particles varies, but generally is from 0.5:1 to 20:1 by weight.

In addition, the ferrofluid composition includes a finely-divided amount of carbon-black particles and typical furnace-type carbon-black particles up to about 4% by weight, which are dispersed in the liquid carrier, during the preparation of the ferrofluid, such as by ball-milling, dispersing, grinding or other grinding and milling techniques. A wide variety of cationic surfactants may be employed, but generally they are quaternary salts, such as the quaternary imidazole salts, and other quaternary-ammonium salts employed in the parent application Ser. No. 736,388.

While the ferrofluid compositions described are particularly useful because of their low viscosity in ferrofluid bearing apparatuses, such ferrofluid compositions also may be usefully employed in other applications, such as in ferrofluid seal apparatuses, where a low-viscosity, electrically conductive ferrofluid composition is useful. Generally, the ferrofluid compositions have varying saturation values, but generally from about 20 to 500 gauss, and more typically 100 to 400 gauss.

The invention will be described for the purpose of illustration only in connection with certain embodiments; however, it is recognized that various changes, additions, modifications and improvements may be made to the illustrative embodiments by those persons skilled within the art, all falling within the spirit and scope of the invention.

DESCRIPTION OF THE EMBODIMENTS

Figure 1:
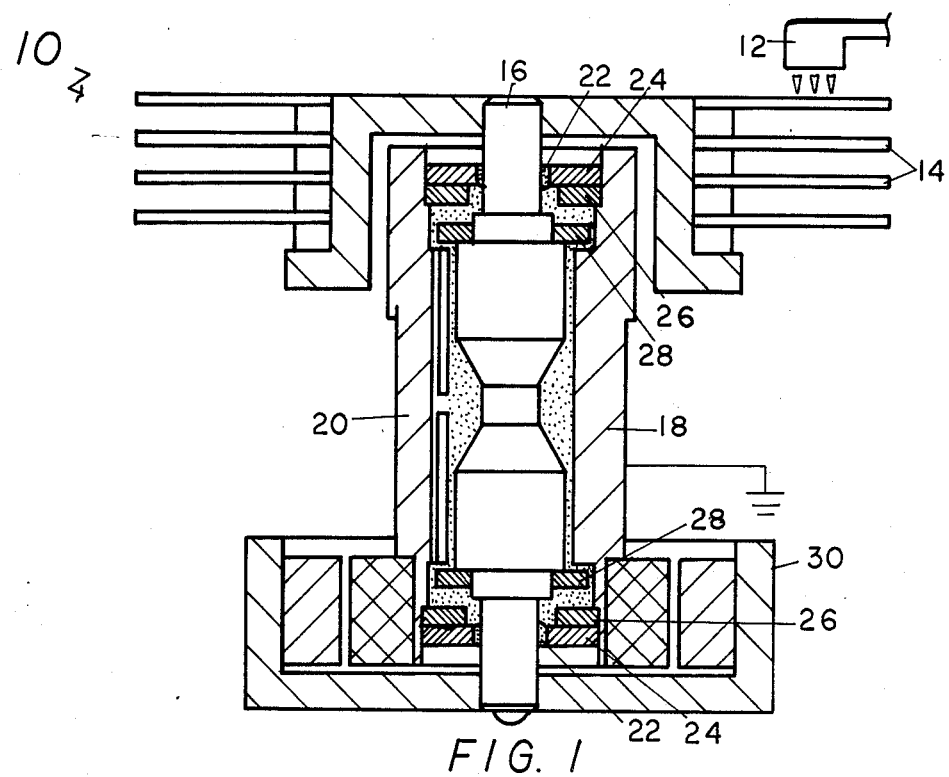
FIG. 1 is a schematic, illustrative representation of a ferrofluid bearing apparatus containing a low-viscosity, electrically conductive ferrofluid.

FIG. 1 illustrates a ferrofluid-film-bearing apparatus used with a computer-disc drive 10, which includes a magnetic head 12 placed in a close relationship with the surface of a computer disc 14, which is driven by a magnetically permeable shaft 16 and placed within a housing 18. A low-viscosity, electrically conductive ferrofluid, having a viscosity of about 15 cps at 27° C. and 200 gauss, is shown as a ferrofluid bearing surrounding the shaft 16. A ferrofluid seal apparatus is shown at the top and bottom of the bearing assembly 10, wherein a ferrofluid O-ring seal 22 is formed about the rotating shaft 16 through the use of a pole piece 24, with a radial gap and electrically conductive ferrofluid in and under the gap to form an O-ring ferrofluid seal 22, and an annular magnet 26, to provide a magnetic-flux field, to retain the ferrofluid 22 in the radial gap. The bearing apparatus 10 also includes a thrust bearing 28 and an in-line motor 30 secured to the shaft, for rotation of the shaft with the computer disc 14.

As illustrated, the ferrofluid bearing apparatus does not contain an electrically conductive grounding button, which is placed in a tensional arrangement with the surface of the shaft, to conduct away accumulated static charges, but rather the bearing assembly employs a low-viscosity, electrically conductive ferrofluid in the bearing cavity about the shaft 16, and, optionally, nonelectrically conductive or electrically conductive ferrofluid to form an O-ring ferrofluid seal at the top of the bearing assembly, so as to provide a seal for the contamination-free area in which the magnetic head 12 operates. In the bearing apparatus illustrated in FIG. 1, any static charge accumulating across the magnetic head 12 and computer disc 14 is continuously conducted through the magnetically permeable rotating shaft 16, the ferrofluid in the radial gap 22, where the ferrofluid is electrically conductive, and the electrically conductive ferrofluid having a bearing fluid through the housing and to the ground; therefore, eliminating the grounding button.

Figure 2:
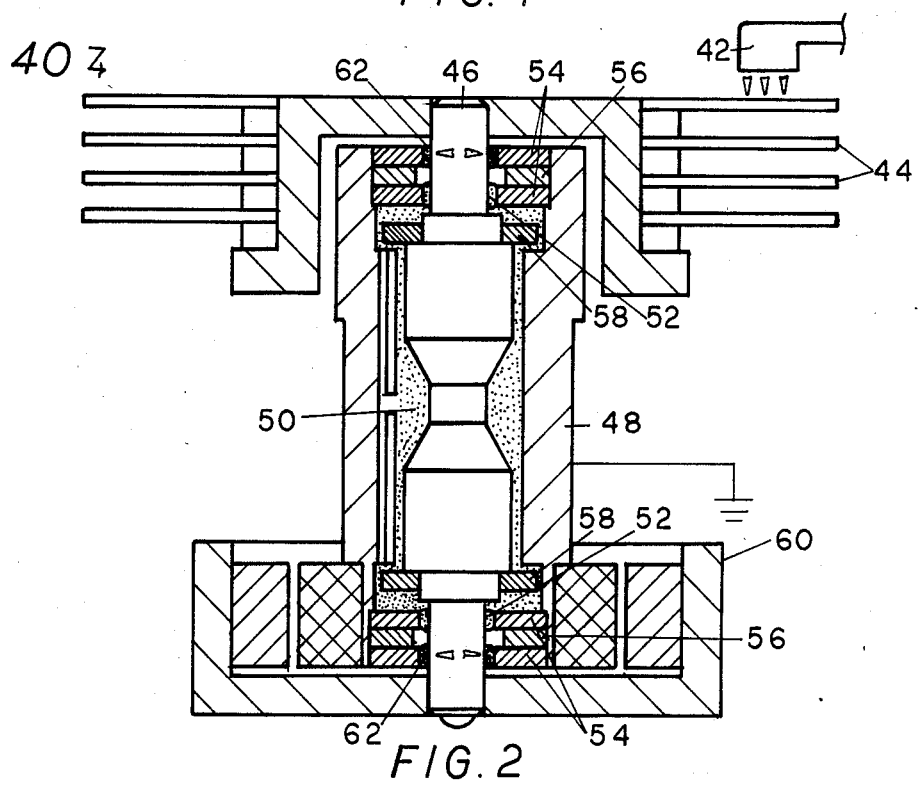
FIG. 2 is a sectional, illustrative ferrofluid bearing apparatus containing electrically conductive ferrofluid, which includes a ferrofluid seal apparatus.

FIG. 2 shows a ferrofluid-film-bearing apparatus 40, having a magnetic head 42 in close proximity to the surface of a computer disc 44, which disc is secured to a magnetically permeable shaft 46 located within a bearing housing 48. An electrically conductive or nonelectrically conductive, low-viscosity ferrofluid 50 is positioned in the bearing cavity within the housing. A dual pole-piece ferrofluid seal apparatus 52 is positioned at the top and the bottom of the housing, which seal apparatus comprises four pole pieces 54, with magnets 56 therebetween. The pole pieces extend into a close, noncontacting relationship with the surface of the shaft, to define a plurality of radial gaps which contain a low resistivity in electrically conductive ferrofluid compositions 62. The shaft 46 also includes upper and lower thrust bearings 58, while the shaft is rotated through an in-line motor 60.

The ferrofluid-film-bearing apparatus 40 illustrated may be employed with electrically conductive or electrically nonconductive ferrofluid as the bearing ferrofluid, and with additionally a low-resistivity, electrically conductive ferrofluid composition, to form the ferrofluid O-ring seals in the ferrofluid seal apparatus at the top and bottom of the housing. Any built-up static charge across the magnetic head 42 and the rotating disc 44 is conducted through the top and bottom conductive ferrofluid seal apparatuses 52, the stationary pole pieces 54 and the housing 48, in addition to the electrically conductive ferrofluid 62 in the radial gap between the shaft 46 and the housing 48; thus, avoiding the necessity to employ a separate grounding button. As illustrated, as a further reduction in the bearing apparatus, electrical resistance is accomplished by the use of two conventional electrically conductive ferrofluid seals at either end of the bearing cavity, with a typical resistance, for example, being 2 to 5 ohms, and with a bearing size of 0.450 inches.

EXAMPLE

A low-viscosity, carbon-particle/cationic surfactant ferrofluid composition, used in the bearing assembly of FIGS. 1 and 2, was prepared as follows:

The magnetite ($Fe_3O_4$) was prepared using 240 grams of $FeSO_4$, 425 ml of 45% $FeCl_2$ and 250 ml of water. The mixture of these three components is maintained at 5° C. under constant agitation, to ensure that the FeSO₄ is completely dissolved.

Fe₃O₄ was precipitated from the solution by the slow addition of ammonia solution (30% NH₃), to reach the pH of 12. The solution must be cooled at 5° C. during Fe₃O₄ precipitation, in order to obtain average magnetic particle diameter in the range of 100 Angstroms. At pH 12 and at 5° C., the suspension is agitated for more than 30 minutes and then the temperature is increased to 90°–100° C. This temperature is maintained for 60 more minutes.

In the suspension, 100 ml of soap is added under a strong agitation. The soap composition is isostearic acid:ammonia (30% NH₃) solution in volume ratio of 1:1.

The suspension having the above composition is mixed for 30 minutes at 90°–100° C., and then 350 cc of an isoparoffinic hydrocarbon fraction (ISOPAR-G, having a boiling-point range of 160° C. to 176° C. of Exxon Chemical Co.) is added to the suspension under constant agitation.

After 60 minutes of strong agitation, all the magnetic particles, well covered with isostearic acid, are suspended in the hydrocarbon fraction. The mixture was settled for 120 minutes. The upper layer contains the hydrocarbon base magnetic colloid. The supernatant liquid was transferred into another beaker. The hydrocarbon base magnetic colloid (300 cc) was mixed with 200 cc of acetone. The magnetite was allowed to settle and the supernatant liquid was siphoned off.

This operation is repeated two more times, in order to eliminate the excess of isostearic acid. The acetone wet slurry was added in a beaker containing 400 cc of heptane.

This slurry was heated to 80° C., in order to remove the actone. The remaining fluid is 450 cc heptane-based magnetic colloid having approximately 400 gauss saturation magnetization.

A total of 55 gr of a polypropoxy quaternary ammonium chloride cationic surfactant (EMCOL cc 55, a polypropoxy quaternary ammonium acetate of Witco Chemical Co.) was added to the heptane-based magnetic colloid at 70° C. under constant stirring. After 30 minutes of agitation at this temperature, the absorption of the second surfactant on the magnetic particles was considered complete. A total of 500 cc of liquid carrier of a polyol ester (Mobile Ester DB 32, having a pour point of −62° C., flash point 204° C., viscosity index 149 of Mobile Chemical Co.) was added under agitation to the heptane-based magnetic colloid. The mixture was held at 100° C. until all the heptane was removed.

The final ferrofluid was kept in a high magnetic-field gradient at 80° C. for 24 hours, in order to remove the large aggregates. The supernatant fluid was filtrated and mixed with carbon-black particles (CONDUCTEX 40-220, Columbia Chemicals Co.).

The content of carbon black is 1% to 3% by weight, in order to provide a good dispersion of carbon black in ferrofluid. The mixing time is 2 hours at room temperature.

The final ferrofluid has 200 gauss in saturation magnetization and 15 to 20 cp viscosity at 27° C.

In both FIGS. 1 and 2, the employment of a low-viscosity, ferrofluid electrically conductive composition of the example, either in the seals or in the bearing cavity, provided for elimination of the grounding button, and permits the bearing-seal composite apparatus merely to be secured to ground; thus, the eliminating the difficulties associated with prior-art apparatuses.

What is claimed is:

1. A low-viscosity, electrically conductive ferrofluid composition for use in ferrofluid hydrodynamic bearing and seal apparatuses, which composition comprises:
   (a) a liquid carrier;
   (b) ferromagnetic particles in an amount sufficient to impart magnetic properties to the ferrofluid composition; and
   (c) in combination finely-divided carbon particles and a cationic surfactant, the cationic surfactant present in an amount to provide for dispersion of the carbon particles and the magnetic particles in the liquid carrier, the carbon particles present in an amount of up to about 4% by weight of the ferrofluid composition and wherein the ratio of the magnetic particles to cationic surfactant ranges from about 0.5:1 to 20:1, to provide a low-viscosity, electrically conductive ferrofluid composition which has an electrical resistivity of about $10^2$ ohms or less, and a viscosity of about 50 cps at 27° C. or less.

2. The composition of claim 1 wherein the cationic surfactant comprises a quaternary-ammonium surfactant.

3. The composition of claim 1 wherein the carbon particles are present in an amount of from about 2% to 4% by weight of the ferrofluid composition.

4. The composition of claim 1 wherein the carrier comprises a nonvolatile hydrocarbon or ester organic liquid-carrier material.

5. The composition of claim 1 wherein the ferrofluid composition has a viscosity of about 15 cps at 27° C. or less.

6. The composition of claim 1 wherein the carbon particles are finely-divided carbon particles having a particle size of less than about 200 Angstroms, and wherein the carbon particles are carbon black derived from a furnace process.

7. The composition of claim 1 wherein the cationic surfactant comprises a quaternary-ammonium surfactant compound, having a nitrogen-positive head group and a long-tail portion which is soluble in the liquid carrier.

8. A low-viscosity, electrically conductive ferrofluid for use in a ferrofluid hydrodynamic bearing apparatus, which ferrofluid composition comprises:
   (a) a nonvolatile hydrocarbon or ester liquid carrier compound;
   (b) finely-divided ferromagnetic particles in an amount sufficient to impart magnetic properties to the liquid carrier;
   (c) up to 4% by weight of finely-divided carbon-black particles; and
   (d) a cationic surfactant composed of a quaternary-ammonium salt comprising a nitrogen-positive head portion and a long-tail portion, which long-tail portion is soluble in the liquid carrier, and which cationic surfactant is present in an amount which, in combination with the carbon particles, provides for a nonthixotropic ferrofluid composition, having an electrical resistivity of about $10^{+2}$ ohms or less, and a low-viscosity of about 25 cps at 25° C. or less.

9. A ferrofluid bearing apparatus, which bearing apparatus comprises in combination:

(a) a housing characterized by a shaft-receiving cavity therein and having a one and another end, and having a radial-bearing, inner wall surface;

(b) a rotary shaft disposed for rotary movement within the shaft-receiving cavity, and defining with the cavity a radial-bearing cavity;

(c) thrust-bearing means to provide support for the longitudinal movement of the rotary shaft in the housing;

(d) a ferrofluid-seal-apparatus means at the one or the other or both ends of the shaft-receiving cavity, to provide a ferrofluid O-ring-type seal about the surface of the rotary shaft;

(e) an electrically conductive ferrofluid composition employed as the ferrofluid in the ferrofluid seal apparatus;

(f) a low-viscosity, electrically conductive ferrofluid composition in the bearing cavity, the ferrofluid composition comprising a liquid carrier, magnetic particles, and a cationic surfactant, wherein the ratio of the magnetic particles to cationic surfactant ranges from about 0.5:1 to 20:1, and having a viscosity of less than about 50 cps at 27° C. and a resistivity of about $10^2$ ohms or less; and (g) means to ground the bearing apparatus, thereby providing an electrically conductive bearing apparatus which conducts accumulated electrical charges from the shaft to the ground, without the need for a mechanical grounding button in contact with the shaft.

10. The bearing apparatus of claim 9 wherein the ferrofluid O-ring-type seal about the surface of the shaft element comprises an electrically conductive ferrofluid composition, and wherein the rotating shaft element and the housing are composed of electrically conductive materials.

11. The bearing apparatus of claim 9, which bearing apparatus comprises a first thrust-bearing means at the one end and a second thrust-bearing means at the other end of the shaft-receiving cavity, and wherein the ferrofluid-seal-apparatus means comprises at first ferrofluid-seal-apparaus means at the one end and a second ferrofluid-seal-apparatus means at the other end of the shaft-receiving cavity, to seal the surface of the rotary shaft at the one and other ends of the shaft-receiving cavity.

12. The bearing apparatus of claim 9 wherein the ferrofluid composition, which forms the O-ring type ferrofluid seal about the surface of the rotating shaft, is the same, low-viscosity, electrically conductive ferrofluid composition employed in the bearing cavity.

13. The bearing apparatus of claim 9 wherein the ferrofluid-seal-apparatus means comprises a single-stage ferrofluid-seal-apparatus means at the one and other ends of the shaft-receiving cavity, which ferrofluid-seal-apparatus means comprises an annular permanent magnet and a single pole piece, one end of the pole piece defining a radial gap about the surface of the shaft apparatus, and ferrofluid disposed in the radial gap, to form the ferrofluid seal at both the one and other ends.

14. The bearing apparatus of claim 9 wherein the ferrofluid-seal-apparatus means comprises a first sealing means at the one end and a second sealing means at the other end of the shaft-receiving cavity, each of the ferrofluid sealing means comprising dual pole pieces and an annular magnet, the dual pole pieces forming radial gaps at the one end thereof with the surface of the rotating shaft, and a dual-stage ferrofluid seal about the surface of the shaft at the one first and the other second ferrofluid sealing means.

15. A computer-disc-drive system which comprises: the bearing apparatus of claim 9; a computer disc secured to the rotating shaft for rotation therewith; a magnetic head means to receive or impart information to the computer disc; and a motor means to provide for the rotary motion of the rotary shaft.

16. A computer-disc-drive system, which computer-disc-drive system comprises in combination:

(a) a magnetic head means to receive or impart information from or to a computer disc;

(b) a computer disc;

(c) a magnetically permeable rotary-shaft element, the computer disc secured to one end of the shaft for rotation therewith;

(d) a housing characterized by a shaft-receiving cavity and an internal wall surface, to define a bearing cavity, the shaft-receiving cavity having a one end and another end;

(e) an electrically conductive, low-viscosity ferrofluid composition disposed in the bearing cavity; the ferrofluid composition comprising a liquid carrier, magnetic particles, and a cationic surfactant, wherein the ratio of the magnetic particles to cationic surfactant ranges from about 0.5:1 to 20:1;

(f) a ferrofluid-seal-apparatus means at the one and the other ends of the shaft-receiving cavity, to define a ferrofluid O-ring-type seals about the surface of the rotary-shaft element;

(g) thrust-bearing means at the one and the other ends of the shaft-receiving cavity, to provide for support of the longitudinal movement of the rotary-shaft element;

(h) a motor means to impart rotary motion to the shaft element and the computer disc; and (i) means to ground the housing, so that accumulated static charges across the magnetic head means and the computer disc may be conducted through the rotating shaft element and the housing to ground, the ferrofluid in the bearing cavity having a viscosity of less than about 25 cps at 27° C., and having a resistance of less than about 50 ohms.

17. The computer-disc-drive system of claim 16 wherein the ferrofluid employed as the ferrofluid O-ring-type seal about the rotating shaft comprises a low-viscosity, electrically conductive ferrofluid having a resistivity of about $10^2$ ohms or less and a viscosity of about 50 cps or less.

* * * * *